US008546975B2

(12) United States Patent
Yeh et al.

(10) Patent No.: US 8,546,975 B2
(45) Date of Patent: Oct. 1, 2013

(54) POWER SUPPLY DEVICE

(75) Inventors: Chia-Ming Yeh, Tu-Cheng (TW);
Chun-Po Chen, Tu-Cheng (TW)

(73) Assignee: Hon Hai Precision Industry Co., Ltd.,
New Taipei (TW)

( * ) Notice: Subject to any disclaimer, the term of this patent is extended or adjusted under 35 U.S.C. 154(b) by 314 days.

(21) Appl. No.: 12/978,629

(22) Filed: Dec. 27, 2010

(65) Prior Publication Data

US 2012/0098339 A1     Apr. 26, 2012

(30) Foreign Application Priority Data

Oct. 20, 2010   (TW) .............................. 99135656 A

(51) Int. Cl.
*H02J 3/14*   (2006.01)
(52) U.S. Cl.
USPC .......................................................... 307/31
(58) Field of Classification Search
USPC .......................................... 307/31; 324/500
See application file for complete search history.

(56) References Cited

U.S. PATENT DOCUMENTS

| 2004/0232769 A1* | 11/2004 | Pickering ..................... 307/10.1 |
| 2008/0028246 A1* | 1/2008 | Witham ........................ 713/330 |
| 2009/0085572 A1* | 4/2009 | McGuire et al. .............. 324/500 |
| 2009/0206870 A1* | 8/2009 | Huang et al. .................. 324/765 |
| 2010/0295573 A1* | 11/2010 | Irie et al. ....................... 324/771 |
| 2011/0304205 A1* | 12/2011 | Lee ................................. 307/31 |

OTHER PUBLICATIONS

Intersil ISL6314 Data Sheet; Oct. 8, 2009.*

* cited by examiner

*Primary Examiner* — Jared Fureman
*Assistant Examiner* — Duc M Pham
(74) *Attorney, Agent, or Firm* — Altis & Wispro Law Group, Inc.

(57) ABSTRACT

A power supply device for an electronic device includes a power supply module, a sampling module, a pulse width modulation (PWM) controller, and a processor. The PWM controller controls the power supply module to be switched on. The sampling module samples current generated by the power supply module and generates sampling signals correspondingly. The PWM controller receives the sampling signals and transmits the sampling signals to the processor. The processor calculates values of the current according to the sampling signals.

10 Claims, 1 Drawing Sheet

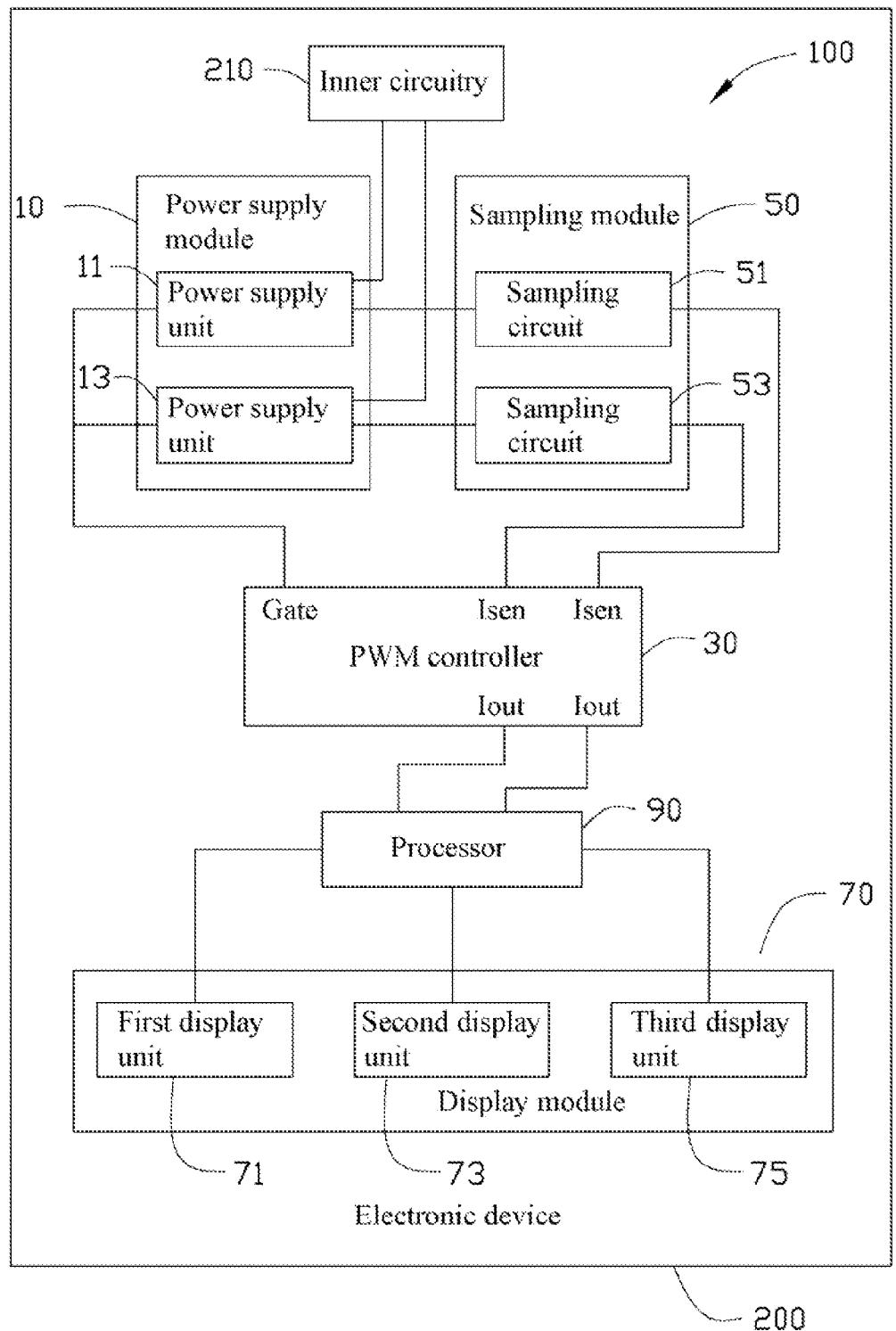

POWER SUPPLY DEVICE

BACKGROUND

1. Technical Field

The present disclosure relates to power supply devices, and particularly to a power supply device with a current detection function.

2. Description of Related Art

Many power supply devices of electronic devices include buck converters. These buck converters can decrease high voltages input to the power supply devices (e.g., voltages provided by commercial power), thereby regulating the input voltages to predetermined values capable of being used by the electronic devices. However, unlike the voltages provided by the buck converters, values of current provided by the buck converters are generally difficult to determine, which may adversely affect working status detection for the electronic devices using the buck converters.

Therefore, there is room for improvement within the art.

BRIEF DESCRIPTION OF THE DRAWINGS

Many aspects of the present power supply device can be better understood with reference to the following drawings. The components in the various drawings are not necessarily drawn to scale, the emphasis instead being placed upon clearly illustrating the principles of the present power supply device. Moreover, in the drawings, like reference numerals designate corresponding parts throughout the figures.

The drawing is a block diagram of a power supply device, according to an exemplary embodiment.

DETAILED DESCRIPTION

The drawing shows a power supply device 100, according to an exemplary embodiment. The power supply device 100 is a multi-phase power supply device capable of providing alternating current (AC) and is used in an electronic device 200 that uses AC, such as many household appliances. The power supply device 100 includes a power supply module 10, a pulse width modulation (PWM) controller 30, a sampling module 50, a display module 70, and a processor 90.

The power supply unit 10 includes two power supply units 11, 13, which are both single-phase power supplies using buck converters. Each of the two power supply units 11, 13 can generate a single-phase current, and the phases of the current generated by the two power supply units 11, 13 alternate with each other. The power supply units 11, 13 are both connected to an inner circuitry 210 of the electronic device 200. The sampling module 50 includes two sampling circuits 51, 53 respectively connected to the power supply units 11, 13.

The PWM controller 30 can be an ISL6314 integrated circuit (IC), for example. The PWM controller 30 includes at least one control pin Gate, two detection pins Isen, and two output pins Iout. The two power supply units 11, 13 are both connected to the control pin Gate, and the PWM controller 30 can generate PWM signals and input the PWM signals to the power supply units 11, 13 to control the power supply units 11, 13 to be switched on and off. The two sampling circuits 51, 53 are respectively connected to the two detection pins Isen. The two output pins Iout are both connected to the processor 90.

The display module 70 is a multiplex display that includes a first display unit 71, a second display unit 73, and a third display unit 75. The first display unit 71, the second display unit 73, and the third display unit 75 are all connected to the processor 90. The display module 70 can be integrated with a conventional display of the electronic device 200. The processor 90 can be an independent microprocessor, and can also be integrated with a conventional central processing unit (CPU) of the electronic device 200. The processor 90 can control the display module 70 to display images according to data provided by the processor 90.

In use, the PMW controller 30 generates a PWM signal and transmits the PWM signal to both the power supply units 11, 13 through the control pin Gate to synchronously switch the power supply units 11, 13 on. Both the power supply units 11, 13 synchronously generate and output current to the inner circuitry 210 of the electronic device 200 to provide electric power to the electronic device 200. At the same time, the sampling circuits 51, 53 respectively sample current generated by the power supply units 11, 13 (i.e., respectively detecting the current generated by the power supply units 11, 13 at predetermined frequencies) and generate sampling signals correspondingly. The PWM controller 30 receives the sampling signals generated by the sampling circuits 51, 53 using the two detection pins Isen, respectively, and transmits the sampling signals to the processor 90 using the two output pins Iout, respectively.

Upon receiving the sampling signals, the processor unit 90 calculates values (e.g., average values or equivalent values) of the current generated by the power supply units 11, 13 according to the sampling signals. Furthermore, the processor 90 calculates a value (e.g., average values or equivalent values) of total current provided to the electronic device 200 by the power supply module 10 (i.e., current generated by superimposing the current generated by the power supply units 11 and 13) according to the values of the current generated by the power supply units 11, 13. The processor 90 controls the display module 70 to display the values of the current generated by the power supply units 11, 13 and the total current provided by the power supply module 10. Particularly, the first display unit 71 displays the value of the current generated by the power supply unit 11, the second display unit 73 displays the value of the current generated by the power supply unit 13, and the third display unit 75 displays the value of the total current provided by the power supply module 10.

In this exemplary embodiment, the power supply device 100 can detect the value of the current generated by each power supply unit 11/13 thereof, and displays the value of the current generated by each power supply unit 11/13 and the value of the total current generated by the power supply module 10. Compared with electronic devices using common power supply devices, it is easier to detect a working status (e.g., a working current value) of the electronic device 200.

The power supply module 10 can include more power supply units similar to the power supply units 11, 13. The phases of current generated by all power supply units of the power supply module 10 alternate with each other. Correspondingly, the sampling module 50 includes more sampling circuits similar to the sampling circuits 51, 53, the PWM controller 30 includes more detection pins Isen and output pins Iout, and the display module 70 includes more display units similar to the display units 71, 73. Each power supply unit is connected to a corresponding sampling circuit, and the corresponding sampling circuit is connected to a corresponding detection pin Isen.

In use, all the power supply units of the power supply module 10 are synchronously switched on by the PWM controller 30 and synchronously generate current output to the inner circuitry 210 to provide electric power to the electronic device 200. Each sampling circuit samples a current generated by its corresponding power supply unit at a predetermined frequency and generates a sampling signal. The PWM controller 30 receives the sampling signal using a corresponding detection pin Isen and transmits the sampling signal to the processor 90 using a corresponding output pin Iout. The processor 90 calculates a value of the current generated by the power supply unit and controls a corresponding display unit of the display module 70 to display the value. The processor 90 further calculates the value of the total current generated by the power supply module 10 according to the values of the current generated by all the power supply units of the power supply module 10.

All the display units 71, 72, 73 can be replaced with a single display. All current values of the power supply module 10 detected by the PWM controller 30 would then be displayed on the single display.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A power supply device for an electronic device, comprising:
   a power supply module for providing electric power to the electronic device, including a plurality of power supply units for generating alternating currents;
   a sampling module connected to the power supply module;
   a pulse width modulation (PWM) controller connected to the power supply module and the sampling module;
   a processor connected to the PWM controller; and
   a plurality of display units connected to the processor and corresponding to the power supply units;
   wherein the PWM controller controls the power supply module to be switched on, the sampling module samples current generated by the power supply units and generates sampling signals correspondingly, the PWM controller receives the sampling signals and transmits the sampling signals to the processor, and the processor calculates values of the currents generated by each of the power supply units and a value of a total current provided by the power supply units according to the sampling signals, each of the display units displays the value of current generated by its corresponding power supply unit and displays the value of the total current.

2. The power supply device as claimed in claim 1, wherein each of the power supply units generates a single-phase alternating current (AC).

3. The power supply device as claimed in claim 2, wherein the phases of the current generated by all the power supply units alternate with each other.

4. The power supply device as claimed in claim 2, wherein the sampling module includes a plurality of sampling circuits corresponding to the plurality of power supply units, each of the sampling circuits connected to a corresponding power supply unit to sample the current generated by the power supply unit and generate a corresponding sampling signal.

5. The power supply device as claimed in claim 4, wherein the PWM controller includes a plurality of detection pins corresponding to the power supply units and the sampling circuits, each of the detection pins connected to a corresponding sampling circuit to receive the sampling signal generated by the sampling circuit.

6. The power supply device as claimed in claim 5, wherein the PWM controller further includes a plurality of output pins corresponding to the power supply units, the sampling circuits, and the detection pins; all the output pins are connected to the processor, and the PWM controller transmits the sampling signal received by each of the detection pins to the processor using an output pin corresponding to the detection pin.

7. The power supply device as claimed in claim 4, wherein the PWM controller further includes a control pin connected to all the power supply units, and the PWM controller controls all the power supply units to be synchronously switched on.

8. The power supply device as claimed in claim 4, wherein the PWM controller is an ISL6314 integrated circuit (IC).

9. The power supply device as claimed in claim 2, further comprising a display module connected to the processor, the display module displaying the values of the current generated by the power supply module.

10. The power supply device as claimed in claim 9, wherein the display module includes a plurality of display units corresponding to the power supply units.

* * * * *